Oct. 13, 1970 R. W. BIROS 3,534,262
IN-CIRCUIT REVERSE LEAKAGE TESTING OF DIODES DRIVING
ASSOCIATED AMPLIFIERS BY MONITORING CHANGES
ON AMPLIFIER OUTPUTS
Filed Oct. 1, 1968

INVENTOR
ROGER W. BIROS

BY La Valle Stak
ATTORNEY

United States Patent Office 3,534,262
Patented Oct. 13, 1970

3,534,262
IN-CIRCUIT REVERSE LEAKAGE TESTING OF DIODES DRIVING ASSOCIATED AMPLIFIERS BY MONITORING CHANGES IN AMPLIFIER OUTPUTS
Roger W. Biros, Mountain View, Calif., assignor to Teletype Corporation, Skokie, Ill., a corporation of Delaware
Filed Oct. 1, 1968, Ser. No. 764,129
Int. Cl. G01r 31/22
U.S. Cl. 324—158                                11 Claims

ABSTRACT OF THE DISCLOSURE

In the testing of integrated circuit packages to detect leaking input diodes in particular ones of a plurality of integrated circuit packages connected to a defective node, a staircase signal is applied to the node, with the first step of the signal being of such a value as to back-bias all of the diodes in the packages connected to the node to the level at which the output transistors in each of the packages are just driven to saturation. If the staircase signal then is increased to a higher value, a diode that is operating properly does not pass any current, and the saturation voltage of the output transistor connected thereto does not change. If, however, a diode at the input of the gate is leaking and the same first step of the staircase signal is applied to the node, the output transistor is first driven to some level of saturation as in the case of a normal diode. When the staircase voltage however is further increased, the diode leakage current forces the transistor deeper into saturation, resulting in a slight drop in the saturation voltage which can be detected and which then is used to find the leaking input diode out of the several diodes connected to the node.

BACKGROUND OF THE INVENTION

In the testing of defective systems made up of integrated circuit packages, it is becoming increasingly difficult to isolate the circuit; so that tests can be performed on the individual packages out of the normal circuit operating environment. In removing and replacing integrated circuit packages, the unsoldering and soldering of the leads may and often does result in damage to the circuit board or to packages which otherwise are not defective. In addition, such testing is time consuming and expensive.

Integrated circuit systems used to perform numerous logic functions often include a number of circuits being driven at a node by an output obtained from a preceding or driving integrated circuit package. The node or connection from one package to another is accessible on the printed circuit board on which the circuit packages are mounted; so that if some means of performing in-circuit testing of defective packages using only the exposed nodes or interconnections between the circuit packages can be utilized, the problems inherent with taking the integrated circuit packages out of circuit for testing can be overcome.

When one gate output is being used to drive a plurality of gate inputs, a defect in the node exists in either of two conditions. The node either is permanently high and is unable to be driven to a low or ground voltage, or the node is permanently grounded or low and is unable to be driven to a high voltage. Certain types of failures are predominant in working with integrated circuit packages, and one of the failures frequently encountered is that the input diodes of the gates are leaking or are shorted and prevent the node from obtaining a high voltage. In other words, the node remains near ground in spite of the operation of the output stage driving the node. When a node fails to go high in spite of the operation of the driving circuit which normally would cause the node to be driven to a high voltage, it is desirable to provide some type of in-circuit test to pin-point which of the integrated circuit packages connected to the node is the defective package. The important point to remember is that the main problem is not in determining what is wrong with the defective package but in locating the defective package; so that it may be removed from the circuit. Thus, it is desirable to perform some type of test which can exercise the package while it is still in its normal circuit environment, rather than trying to find out what is wrong with the defective node and the particular defective package.

SUMMARY OF THE INVENTION

A signal is applied to a diode in an amount sufficient to back-bias the diode to just the point where an output amplifier connected thereto provides a first output voltage. The back-bias signal then is further increased and a change in the amplifier output voltage indicates that the diode is leaking.

DETAILED DESCRIPTION

Figure 1:
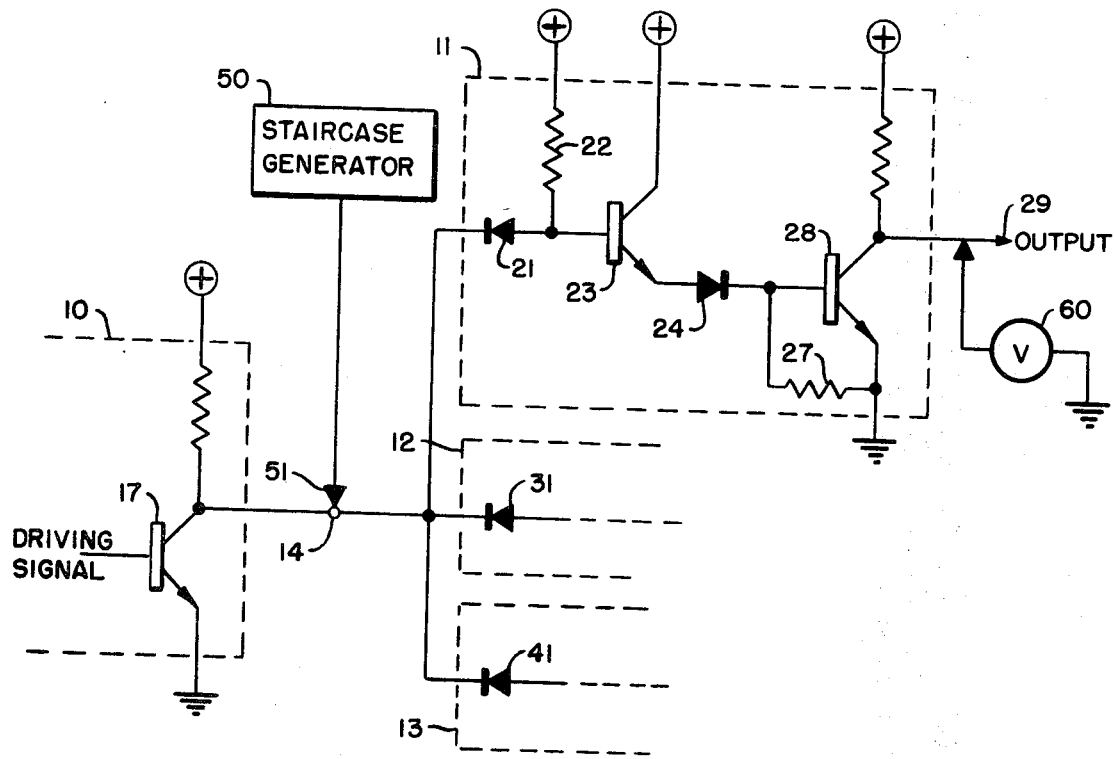
FIG. 1 is a schematic diagram of a typical circuit being tested in accordance with a preferred embodiment of the invention.

Referring now to FIG. 1, there is shown a preferred embodiment of the invention in which the output of a first integrated circuit package 10 is used to drive the inputs of three integrated circuit packages 11, 12 and 13, the inputs to which are connected together at a common node 14. The boundaries of these integrated circuit packages are indicated generally by the dotted lines surrounding each package, and only the areas outside of the dotted lines are accessible externally of the integrated circuit packages. The packages 11, 12 and 13 all are identical, so that only the package 11 has been shown in detail in FIG. 1. It should be noted, however, that no attempt is made to show all of the circuit details of the circuits in any of the packages 10–13, since such details form no part of the invention and would unnecessarily complicate the description and the drawing. Only sufficient details of the internal circuits of the packages 10–13 are provided as will aid in understanding the preferred embodiment of the invention.

In the operation of the circuit, an output transistor 17, located in the output integrated circuit package 10, provides output signals varying between ground and a positive potential depending upon whether the transistor 17 is driven into saturation or is cut off. The voltage at the node 14 also should vary between ground and this same positive potential, provided the inputs to each of the integrated circuit packages 11, 12 and 13 are operating properly; that is, that none of the input diodes to these packages are leaking.

Each of the packages 11, 12 and 12 has an input diode 21, 31 and 41, having its cathode connected to the node 14. The anode of the diodes 21, 31 and 41, are connected to the junction between a resistor 22 and the base of an NPN input transistor 23 forming the first stage of a two-stage amplifier. The other terminal of the resistor 22 is connected to a source of positive potential. Thus, when the node 14 is at ground potential, the diodes 21, 31 and 41, all are forward-biased and conduct current from the source of positive potential through the resistor 22 to the node 14. Thus, the potential at the junction between the resistor 22 and the base of the transistor 23 is near ground potential and the transistor 23 is biased into a state of nonconduction.

When the voltage at the node 14 rises to a positive potential, the diodes 21, 31 and 41, are back-biased; so that the potential at the junction between the resistor 22 and the base of the transistor 23 rises substantially to the value of he source of positive potential. This causes the transistor 23 to be biased into a state of conduction so that current flows therethrough and through a connecting diode 24 and a resistor 27 to ground. The junction between the cathode of the diode 24 and the resistor 27 is connected to the base of an NPN transistor 28; and when current is flowing through the transistor 23, the voltage drop across the resistor 27 causes a sufficiently positive potential to be applied to the base of the transistor 28 to drive it to saturation, causing the output obtained at an output terminal 29 to be near ground potential.

On the other hand, when the transistor 23 is biased to a state of nonconduction, the potential on the base of the transistor 28 is substantially the same as the potential on its emitter; so that it is biased to a state of nonconduction, causing the potential on the output terminal 29 to be near the value of the positive potential source connected to the collector of the transistor 28.

If any of the diodes 21, 31 and 41, connected to the node 14 is leaking excessively in the reverse direction, the node 14 cannot be driven to a positive or high value and remains at a low value. Failure of the node to go high or to rise to a positive potential results in a failure of the output of the circuit packages 11, 12 and 13 from following the signals applied to the node by the output of the driving package 10. The outputs of the packages 11, 12 and 13 remain at a predetermined fixed value irrespective of the signals applied to the node 14. Since several packages are connected in common to the node 14, it is not readily possible to ascertain which of the packages 11, 12 or 13 contains the defective leaking input diode.

In order to test the packages 11, 12 and 13 to find the defective diode without removing any of the packages from the circuit of which they are a part, a staircase signal generator 50, having a probe 51, may be used to supply signals to the node 14. This is done merely by attaching or touching the probe 51 to the exposed wiring present at the node 14. The staircase generator 50 then supplies voltages of the type shown in curve A of FIG. 2 to the node 14. The voltages supplied by the generator 50 override any signals supplied to the node 14 from the output of the driving transistor 17 located in the driving circuit package 10. These staircase output signals are in three steps, ranging from 0 volts or ground potential at which time the circuit packages 11, 12 and 13 all should have the diodes 21, 31 and 41 therein forward-biased; so that the output voltages of the packages are at a maximum amount $V_0$ as shown in the first step ($t_0-t_1$) of curve B of FIG. 2.

Figure 2:
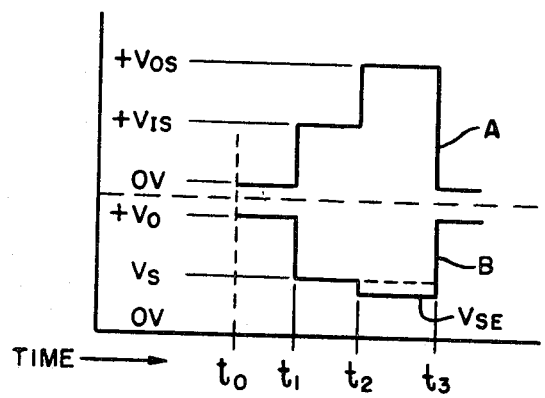
FIG. 2 shows waveforms useful in explaining the operation of the circuit shown in FIG. 1.

The next step in the voltage applied to the node 14 from the output of the generator 50 is indicated between times $t_1$ and $t_2$ in FIG. 2 and is an input voltage $V_{is}$ just sufficient to back-bias a normal diode 21, 31 or 41 to cause the output transistors 28 in the integrated circuit packages 11, 12 and 13 to be driven to saturation. Thus, the saturation voltage sensed by a voltmeter 60 connected between ground and the output terminal 29 of the integrated circuit packages 11, 12 or 13 is the voltage $V_s$ indicated between times $t_1$ and $t_2$ in FIG. 2 on curve B. All of the packages 11, 12 and 13, including those having a leaking input diode 21, 31 or 41, will exhibit an output potential of the type shown between times $t_1$ and $t_2$ on curve B of FIG. 2.

The output of the generator 50 then is further increased as shown between times $t_2$ and $t_3$ on curve A to a voltage $V_{os}$ which is substantially over the amount required to back-bias the diodes 21, 31 and 41 connected to the node 14. When this occurs, a normal diode or one that is functioning properly continues to be back-biased but passes negligible current in the reverse direction; so that the output voltage of the transistor 28 applied to the output terminal 29 of such a properly functioning package does not change, and the voltmeter 60 does not detect any change as shown by the dotted line between times $t_2$ and $t_3$ on curve B of FIG. 2. If, however, the input diode for the package to which the voltmeter 60 is connected is a leaking diode, it conducts additional current in the reverse direction, driving the transistor 28 further into saturation; so that the output voltage detected by the voltmeter 60 at the terminal 29 drops slightly as indicated in the solid line portion $V_{se}$ of curve B between times $t_1$ and $t_2$ in FIG. 2. This change in the saturation voltage of the output transistor 28 is sufficient to indicate a defective diode. Thus, the defective package can be distinguished from the normally operating packages, so that it then can be removed from the circuit.

Alhough the foregoing description has been made in conjunction with a preferred embodiment of the invention suitable for testing integrated packages in circuit, it should be understood that the principle of the invention also could be applied to wired circuits using discrete components or to conventional printed circuits. The operation of the test is the same, irrespective of the type of cricuit to which the test is being applied. This manner of testing, however, is of greatest utility with respect to integrated circuit packages where a large number of packages are mounted on a single card where isolation of the packages from one another in order to perform tests is relatively difficult. It also should be noted that the particular circuit used to illustrate the invention is not the only circuit to which this type of test could be applied. This circuit, however, conveniently illustrates the relative ease with which a defective package may be distinguished from a number of good packages without in any way harming the circuit or altering its conventional mode of operation. Other modifications of the invention, varied to fit particular operating conditions, will be apparent to those skilled in the art; and the invention is not to be considered limited to the embodiment shown for purposes of disclosure, but it covers all changes and modifications which do not constitute departures from the true scope of the invention.

What is claimed is:

1. A system for testing a diode for reverse leakage including:
   an amplifying device;
   a diode connected to drive the amplifying device;
   means for back-biasing the diode to the point where the amplifying device provides a first output voltage;
   means for increasing the back-bias on the diode; and
   means for detecting a change, if any, in the output voltage of the amplifying device when the diode is further back-biased, a change in voltage indicating that the diode is leaking.

2. Apparatus according to claim 1 wherein the means for back-biasing the diode is a staircase signal generator.

3. Apparatus according to claim 1 further including additional amplifiers driven by additional diodes, with all of the diodes being connected together to a common terminal, whereby all of the diodes are back-biased by the same amount simultaneously, and wherein the output voltage of each of the amplifiers is individually detected.

4. A method for testing for the reverse-leakage current of a diode, selectively back-biased and forward-biased to drive an output amplifier to produce output voltages of first and second values, comprising the steps of:
   back-biasing the diode to the point where the output amplifier produces said first output voltage;
   detecting the output voltage of the amplifier;
   back-biasing the diode further; and
   detecting the output voltage of the amplifier when said diode is further back-biased, wherein a change in said detected voltage from said first voltage indicates excessive leakage current in the diode.

5. A method according to claim 4 wherein a plurality of output amplifiers are driven by a plurality of diodes, connected together at a common point and wherein the step of back-biasing includes simultaneously back-biasing said diodes to a point just sufficient to drive their output amplifiers to produce said first output voltage; and wherein the step of further back-biasing includes simultaneously further back-biasing said diodes and wherein the steps of detecting include individually detecting the outputs of the amplifiers to detect any change from said first output voltage.

6. Apparatus for performing an in-circuit test for reverse current leakage in a circuit including an input diode comprising:
  a circuit including an output transistor and a single input diode for driving the output transistor between cut-off and saturation in accordance with forward-bias and reverse-bias potentials applied to the input diode;
  means for normally applying a varying potential to the input of the diode to cause it to be driven between forward-bias and reverse-bias;
  means for overriding the normal driving means to cause the diode to be driven in accordance with a predetermined pattern of potentials, at least one of which is a reverse potential in excess of that required to just reverse-bias the diode; and
  means for detecting the output voltage across the output transistor.

7. Apparatus according to claim 6 wherein the means for overriding the normal voltage supplying means is a staircase signal generator, having at least three steps in its output, the steps being one for forward-biasing the diode, a second for just reverse-biasing the diode and a third for substantially reverse-biasing the diode.

8. Apparatus according to claim 6 including a plurality of circuits, each having an output transistor and a single input diode for driving the output transistor between cut-off and saturation, wherein the inputs of all of the diodes are connected together and wherein the potential applying means and the overriding means operate on all of said diodes simultaneously and the detecting means individually detects the output voltages across the output transistors.

9. A method for testing a doide for excessive reverse-current leakage wherein the diode under test is used to drive an output transistor between cut-off and saturation comprising the steps of:
  applying a reverse-bias potential to the diode in an amount just sufficient to reverse-bias the diode, so that the transistor driven thereby is driven into saturation;
  detecting the saturation voltage of the transistor;
  applying an increased reverse-bias voltage to the diode in excess of that required to just reverse-bias the diode; and
  detecting the change, if any, in the saturation voltage of the output transistor.

10. A method according to claim 9 wherein a plurality of diodes, each driving an output transistor, are simultaneously tested by connecting the inputs of the diodes together at a common node and applying the reverse-bias and increased reverse-bias potentials to said node and individually detecting the saturation voltages and changed saturation voltages of the output transistors connected to each diode.

11. A method according to claim 9 wherein applying the reverse-bias and increased reverse-bias voltages to the diodes is accomplished by applying the voltages in discrete steps.

References Cited

UNITED STATES PATENTS 2,922,954   1/1960   Bigelow _____ 324—158

RUDOLPH V. ROLINEC, Primary Examiner

E. L. STOLARUN, Assistant Examiner